(12) United States Patent
Parsons et al.

(10) Patent No.: US 10,906,663 B2
(45) Date of Patent: Feb. 2, 2021

(54) APPARATUS FOR BOUNDARY LAYER AIR INLET UTILIZATION

(71) Applicant: Textron Innovations Inc., Providence, RI (US)

(72) Inventors: Thomas Dewey Parsons, Fort Worth, TX (US); Angel David Rosado, Aledo, TX (US); Robert Paul Reynolds, Euless, TX (US); David Frank Haynes, Arlington, TX (US); William Mathisen Gons, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 253 days.

(21) Appl. No.: 16/042,024

(22) Filed: Jul. 23, 2018

(65) Prior Publication Data

US 2020/0023988 A1    Jan. 23, 2020

(51) Int. Cl.
| | | |
|---|---|---|
| *B64D 33/08* | (2006.01) | |
| *F15D 1/00* | (2006.01) | |
| *B64D 33/02* | (2006.01) | |

(52) U.S. Cl.
CPC .............. *B64D 33/08* (2013.01); *B64D 33/02* (2013.01); *F15D 1/0025* (2013.01); *B64D 2033/0253* (2013.01)

(58) Field of Classification Search
CPC ............ B64D 2033/0253; B64D 33/08; F15D 1/0025
USPC ...................................................... 244/53 B
See application file for complete search history.

(56) References Cited

U.S. PATENT DOCUMENTS

| | | | |
|---|---|---|---|
| 3,430,640 A | * | 3/1969 | Lennard .................. F02C 7/042 |
| | | | 137/15.1 |
| 3,470,703 A | | 10/1969 | Nen |
| 3,613,704 A | * | 10/1971 | Goldsmith ............. F02C 7/042 |
| | | | 137/15.2 |
| 4,232,515 A | | 11/1980 | Brown |
| 5,026,004 A | | 6/1991 | Dobie et al. |
| 5,414,992 A | | 5/1995 | Glickstein |
| 5,461,882 A | | 10/1995 | Zywiak |
| 6,293,494 B1 | | 9/2001 | Scherer et al. |
| 7,222,819 B1 | | 5/2007 | Kelnhofer |
| 7,624,944 B2 | | 12/2009 | Parikh et al. |
| 7,861,968 B2 | | 1/2011 | Parikh et al. |

(Continued)

FOREIGN PATENT DOCUMENTS

GB        2340890 A    3/2000

OTHER PUBLICATIONS

GA8 Aircraft Systems, Retrieved from: https://missions.capnhq.gove/ops/DOT/school/aircraftsystem.cfm, Mar. 19, 2018, pp. 1-17.

*Primary Examiner* — Claude J Brown
(74) *Attorney, Agent, or Firm* — Whitaker Chalk Swindle & Schwartz PLLC; Enrique Sanchez

(57) ABSTRACT

A boundary layer utilization apparatus for intake of air to a high speed aircraft, comprises a first air inlet adjacent an exterior surface of a fuselage of the aircraft and offset from the fuselage enough to integrate a second air inlet in the offset space to ingest and divert the boundary layer air flowing next to the fuselage into the aircraft for a useful purpose such as cooling the engine compartment. The second air inlet is disposed aft of the first air inlet to minimize hot gas re-ingestion.

8 Claims, 4 Drawing Sheets

(56) References Cited

U.S. PATENT DOCUMENTS

| | | | | |
|---|---|---|---|---|
| 8,292,217 B2 * | 10/2012 | Smith | ................ | G06F 30/15 |
| | | | | 244/53 B |
| 9,239,005 B2 | 1/2016 | Strecker et al. | | |
| 9,708,069 B2 | 7/2017 | Richardson et al. | | |
| 2003/0132342 A1 * | 7/2003 | Koncsek | ............ | B64D 33/02 |
| | | | | 244/53 B |
| 2012/0260661 A1 * | 10/2012 | Megerian | ............ | F02C 7/057 |
| | | | | 60/772 |
| 2017/0066527 A1 * | 3/2017 | Huynh | ............ | B64D 33/02 |

* cited by examiner

APPARATUS FOR BOUNDARY LAYER AIR INLET UTILIZATION

BACKGROUND OF THE INVENTION

1. Field of the Invention

The present invention generally concerns the field of aircraft boundary layer air management and more specifically concerns apparatus for utilizing boundary layer air flowing along the fuselage of an aircraft to provide air for cooling applications within the aircraft.

2. Background of the Invention and Disclosure of Prior Art

In a high speed aircraft, a ram air engine inlet may be typically disposed proximate but slightly away from the surface of the fuselage to prevent the ingestion of turbulent boundary layer air flowing along the exterior surface of the moving aircraft. This turbulence can result in a loss of pressure recovery at the engine inlet face, and a loss of power and reduced aircraft performance. The turbulent boundary air can also distort or disrupt the air flow at the engine inlet face, leading to engine surges. A conventional remedy is to shift the engine air inlet away from the exterior surface of the aircraft and out of the boundary layer air flow path. This remedy does not utilize the boundary layer air (it is simply bypassed around the engine inlet) and has the disadvantage of increased drag because the engine air inlet extends away from the aircraft surface. As the velocity capability of any aircraft in forward motion—including rotorcraft—increases, the need to reduce drag, which increases as the square of the velocity. Moreover, the increase in velocity also worsens the problems of pressure recovery and disruption of the air flow.

The prior art includes various methods and apparatus' for using or enhancing the utility of boundary layer effects in aircraft designs, in one example of the prior art, U.S. Pat. No. 7,624,944 issued to Parikh et al., an apparatus for use with commercial or military jet aircraft for conditioning cabin air includes separate air inlets for extracting air from the air stream. A first pitot inlet is held away from the surface of the fuselage by a prescribed spacing, out of the path of boundary layer air, for directing unimpeded air to an air compressor in the cabin air conditioning pack. A second inlet opening flush with the surface of the fuselage and positioned forward of the first inlet is used to extract the disordered, lower velocity boundary layer air before it reaches the pitot inlet. Air extracted by the second air inlet is directed to a heat exchanger of the cabin air conditioning pack.

In another example, U.S. Pat. No. 6,293,494, Scherer et al., extracts ram air inlet from a flush opening in the fuselage of an aircraft into a passage that diverts inlet air to auxiliary systems inside the aircraft. The passage is formed by the fuselage skin and a recessed duct formed along its inside surface. However, when the aircraft is on the ground air flow entering the downstream edge of the opening over the lip formed by the fuselage skin is disrupted by the lip, causing a "separation bubble" (turbulence) along the inside of the aircraft skin, reducing the effectiveness of the diverted air flow. A conforming "air guide" spaced forward of the edge of the lip creates a slot between the lip and the air guide to improve control of the boundary layer air and minimize the turbulence, allowing the air flow near the tip to improve the utility of the diverted air.

In U.S. Pat. No. 9,708,069, Richardson et al., a ram air duct from a flush inlet opening through an equipment bay to a flush exhaust opening in the fuselage skin of an aircraft provides cooling air to a heat source within the equipment bay. To cool the relatively high temperature of the outlet air heated during its passage through the duct, a stream of cooler air from an interior volume of the aircraft is injected into the exhaust air flow near the exhaust outlet. The injected air forms a cooler "boundary" layer in the hotter exhaust air as it exits the flush exhaust opening. The cooling of the exhaust air thus achieved reduces the exposure of the external surface of the fuselage just aft of the flush outlet opening.

The challenges of providing sufficient air flow volume into the ram air engine of a high speed aircraft, including rotorcraft, for example, and adequate cooling of the ram air engine compartment require solutions that pay close attention to balancing these requirements with the related factors of reduction in drag caused by structures protruding into the air flow along the fuselage of the aircraft or rotorcraft, diversion of the boundary layer air in such a way as to minimize turbulence while utilizing it for a useful purpose, and minimizing the use of air scoops or other protruding structures that disrupt airflow along the fuselage. Systems adapted to the relatively steady state conditions of supplying air for aircraft cabin air conditioning—as compared with the wide-ranging operating conditions of the ram air engine of aircraft or rotorcraft—are inadequate for dealing with the much larger volumes of air required for operating the ram air engines of such aircraft, where the effects of drag and turbulence are multiplied.

SUMMARY OF THE INVENTION

Accordingly there is provided in one embodiment a boundary layer utilization apparatus for a high speed rotorcraft, comprising a first air inlet adjacent an exterior surface of a fuselage of the rotorcraft and offset therefrom by a predetermined offset spacing to minimize ingestion of boundary layer air flowing along the exterior surface, to provide primary air to an engine intake; and a second air inlet disposed within the predetermined offset spacing between the first air inlet and the fuselage to divert the boundary layer air proximate the first air inlet from ingestion into the first air inlet thereby to provide secondary air for cooling an engine compartment.

In certain aspects there are provided a first air inlet configured as a scoop to direct, with minimal drag, the primary air into the engine intake; and a second air inlet disposed aft of the first air inlet to minimize hot gas re ingestion.

In other aspects the invention provides that a volume of substantially undisrupted air is conducted to the engine intake for powering the rotorcraft that a second air inlet comprises an inlet ramp formed in the fuselage to merge the cross-sectional area of the second air inlet with the cross-sectional area of the offset space between the entrance of the first air inlet and the fuselage.

In other aspects the second air inlet is recessed within the predetermined offset space between the first air inlet and the fuselage, to improve the utilization of the boundary layer air and reduce drag; and the dimensions of the second air inlet are configured to conform to the predetermined offset space between the first air inlet and the fuselage of the rotorcraft.

DETAILED DESCRIPTION OF THE INVENTION

In an advance in the state of the art, a novel air inlet apparatus for ram air engines as used in high speed aircraft such as rotorcraft is provided that improves engine performance and reduces drag by diverting the boundary layer air into the engine hay for cooling the engine bay without adding structures that protrude into the airstream along the rotorcraft. The structure for diverting the boundary layer air is incorporated into an existing structural feature of the rotorcraft, the offset spacing of the engine's ram air inlet. The primary inlet (ram air) airstream, cleansed of most of the boundary layer component routed into this secondary air inlet disposed within the offset space, is undisrupted air—unimpeded by turbulence, distortion, or erratic flow (surges) into the engine for maximum engine performance.

Figure 1:
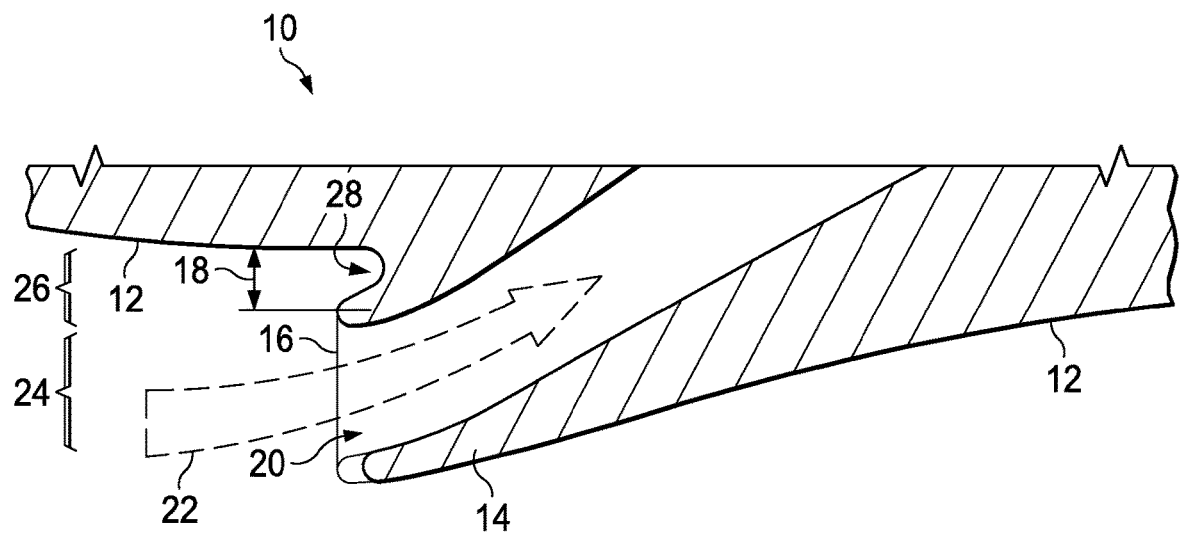
FIG. 1 illustrates a cross section view of a ram air inlet for airflow to an engine of an aircraft or rotorcraft according to the prior art.

FIG. 1 illustrates a Gross section view of a ram air inlet for airflow to an engine of an aircraft or rotorcraft according to the prior art. In this example of a portion of a fuselage 12 of a rotorcraft 10 is shown including a protruding ram air inlet structure 14 for admitting airflow 22, such as from the forward motion of the rotorcraft, into the engine (not shown) of the rotorcraft. The airflow 24, 26 along the fuselage 12 includes boundary layer air 26 having a velocity that is lower the closer it is to the fuselage.

The air inlet structure 14 is supported by a recessed strut 28 to offset the structure of the air inlet structure 14 from the fuselage 12 by an offset 18. The recessed strut 28 may be further contoured for minimal resistance to airflow around it. This offset 18 of the air inlet structure 14 provides the spacing required to avoid or minimize ingestion of boundary layer air into the engine. As is well understood by persons skilled in the art, air flow that is close to a surface that is moving through the air tends to lose velocity the closer it is to the moving surface. This is due to the friction effects of the surface acting on the air molecules. The reduced velocity of these boundary layers may result in turbulence in the air flow when the air molecules encounter obstacles ire their path such as the recessed strut 28 created by the offset of the air inlet structure 14 from the fuselage 12. This turbulence can result in a loss of pressure recovery at the engine inlet face. which results in a loss of power and reduced aircraft performance. The turbulent boundary air can also distort or disrupt the air flow 22 at the engine inlet face 20. leading to engine surges. In the prior art shown in FIG. 1, the boundary layer air is not utilized but instead is diverted away from the ram air inlet and disbursed into the airstream passing the fuselage of the aircraft.

The present invention solves these problems by providing a path for the boundary layer air in a useful way. The boundary layer air is diverted into the aircraft for use by other systems; and it is diverted in a way that reduces drag. In combination these two benefits yield measureable improvements in efficiency, performance, and economy of operation.

Figure 2:
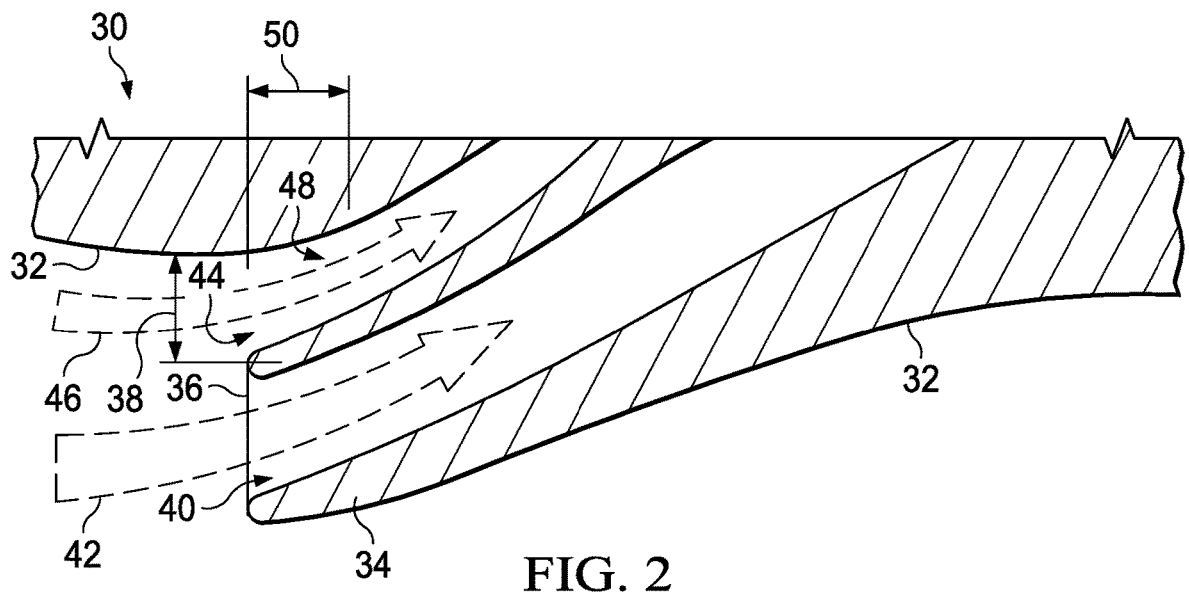
FIG. 2 illustrates a cross section view of a secondary it inlet disposed between a ram air inlet and an exterior surface or fuselage of an aircraft in accordance with an embodiment of the claimed invention.

FIG. 2 illustrates a cross section view of a secondary air inlet disposed between a primary ram air inlet and an exterior surface or fuselage of an aircraft in accordance with an embodiment of the claimed invention. This view is similar to the view depicted in FIG. 1 except that it illustrates the modified air inlet that utilizes the boundary layer air to useful purpose. In FIG. 2 an inlet ramp portion of a fuselage 32 of a rotorcraft 30 is shown including a protruding air inlet structure 34 having an air inlets 40 and 44 for admitting airflow—respectively 42 and 46—due to the forward motion of the rotorcraft 30. In this description, the air inlets 40 and 44 are denoted as the first air inlet 40 and the second air inlet 44. The airflow 42, 46 along the fuselage 32 includes airflow 42 that is essentially of uniform velocity and a boundary layer 46 air of a variable velocity that diminishes the closer it is to the fuselage 32. The primary ram air inlet 40 routes airflow 42 into the air-cooled engine (not shown) of the rotorcraft 30. The secondary air inlet 44 diverts the boundary layer air 46 into an internal portion of the rotorcraft 30.

Continuing with FIG. 2, the inlet lip 36 of the air inlet structure 34 is spaced away or offset from the fuselage 32 by an offset 38. The offset 38 is provided to avoid or minimize ingestion of boundary layer air 46 into the engine. In addition, the second air inlet 44 is preferably disposed between the air inlet structure 34 and the fuselage 32 as shown in FIG. 2. The effective entry to the second air inlet 44 is placed at or slightly aft of the first air inlet 40 (see the spacing dimension 50) to minimize hot gas re-ingestion. The term "hot gas re-ingestion" refers to hot exhaust gases that appear in the path of the primary ram air inlet 40, such as when the rotorcraft is on the ground or is hovering, or when a tailwind forces hot exhaust toward the primary air inlet. The hot gases raise the temperature of the primary inlet air, which tends to reduce engine power. The offset 38 may further be modified by broadening its entrance to open the offset 38 into a passage 48 that conducts the boundary layer air 46 into the engine compartment to provide cooling for the engine. Thus, all of the airflow 42, 46 flowing toward the air inlet structure 34 is used, a primary portion 42 inlet to the engine and the secondary boundary layer air 46 inlet for cooling the engine bay. The secondary boundary layer air 46 may alternatively be directed to other subsystems of the rotorcraft without departing from the concepts disclosed herein.

Figure 3:
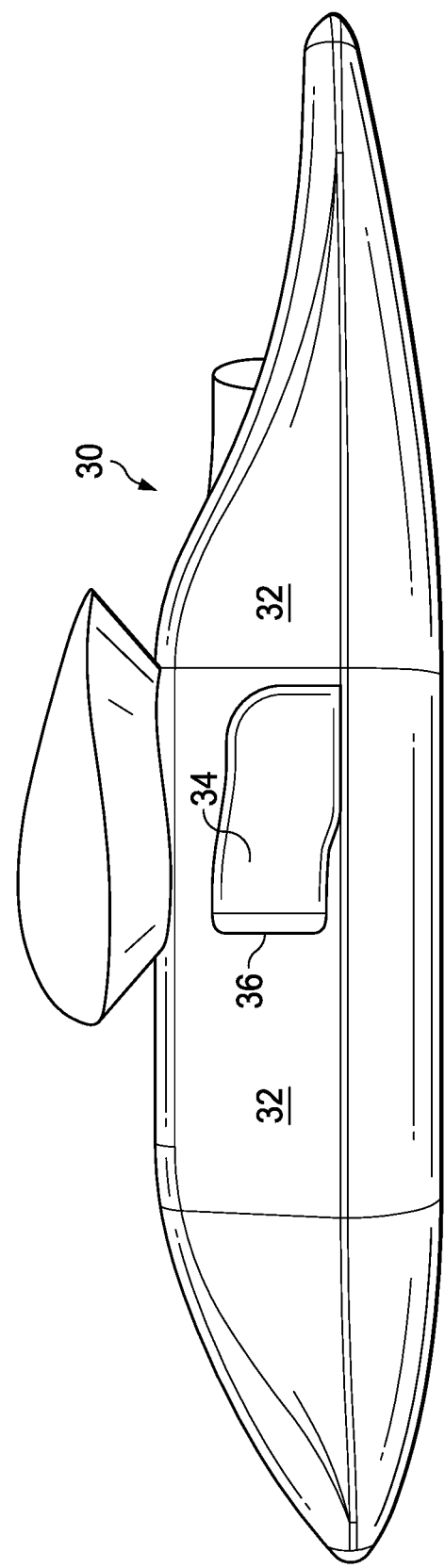
FIG. 3 illustrates a side view of an aircraft that shows one embodiment of a ram air inlet in accordance with an embodiment of the present invention.

FIG. 3 illustrates a side view of an aircraft that shows one embodiment of a ram air inlet in accordance with an embodiment of the present invention. The rotorcraft 30 includes a ram air (primary) inlet 34 protruding from the fuselage 32, which disposes the ram air inlet 34 in the airstream when the rotorcraft is in forward motion during flight. During flight air is admitted (forced) into the inlet lip 36 for use by the engine, this view the ram air inlet is located on the side of the fuselage 32 under an airfoil. However, the ram air inlet 34 may be disposed on other surfaces of the fuselage 32 to position it for optimum efficiency.

Figure 4:
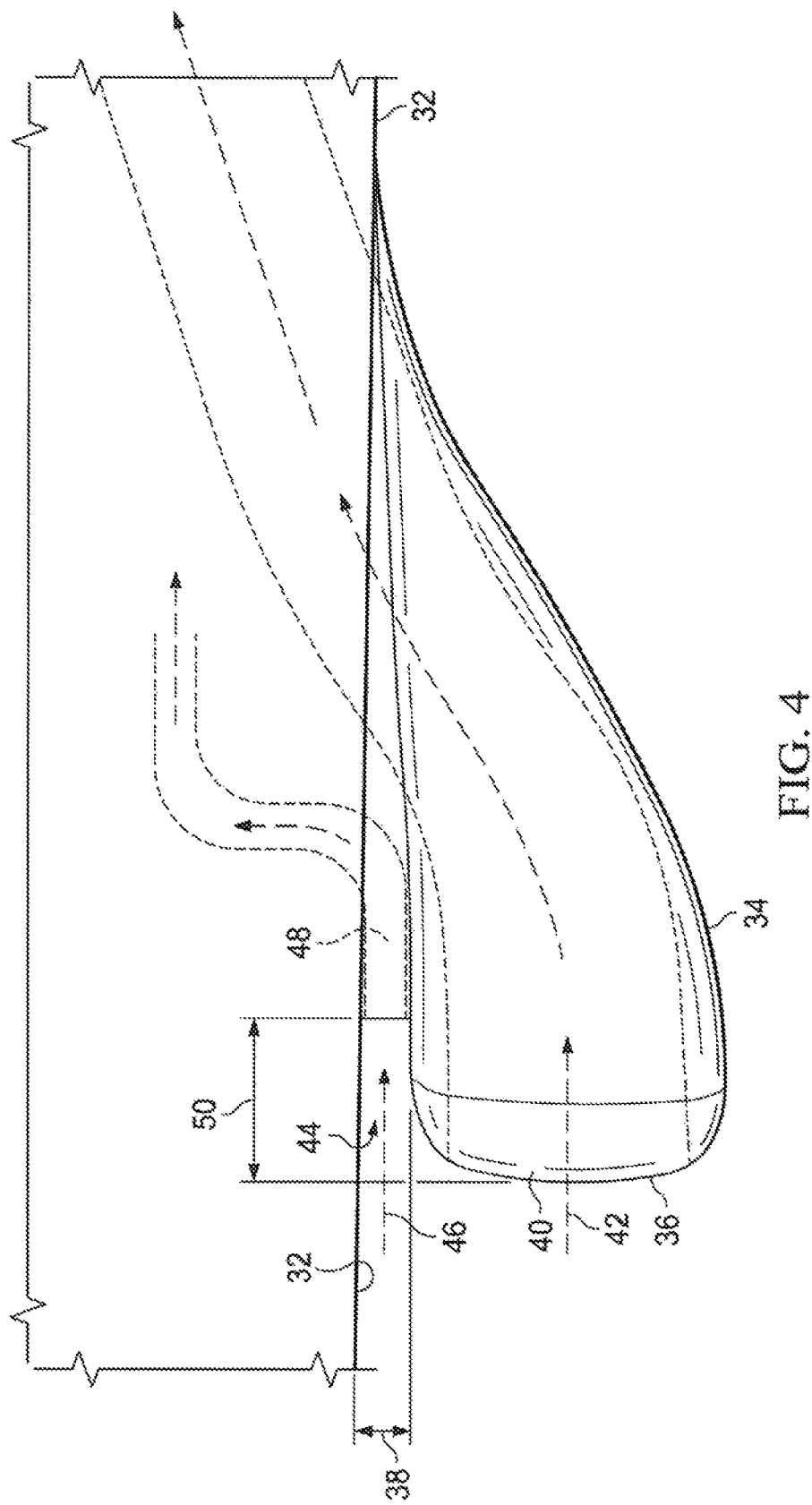
FIG. 4 illustrates a downward cross section view of the embodiment depicted in FIG. 3 in accordance with the present invention.

FIG. 4 illustrates a downward view of a cross section of the embodiment depicted in FIG. 3 in accordance with the present invention. This view corresponds to FIG. 3 but shown on only a portion of the rotorcraft structure of FIG. 3. The reference numbers identify structures that are substantially the same in both views. This top-down view clearly shows the recessed disposition of the second air inlet 44 with respect to the first air inlet 40 as described in FIG.

2, which places the second air inlet 44 aft of the first air inlet 40 to minimize hot gas re-ingestion.

Figure 5:
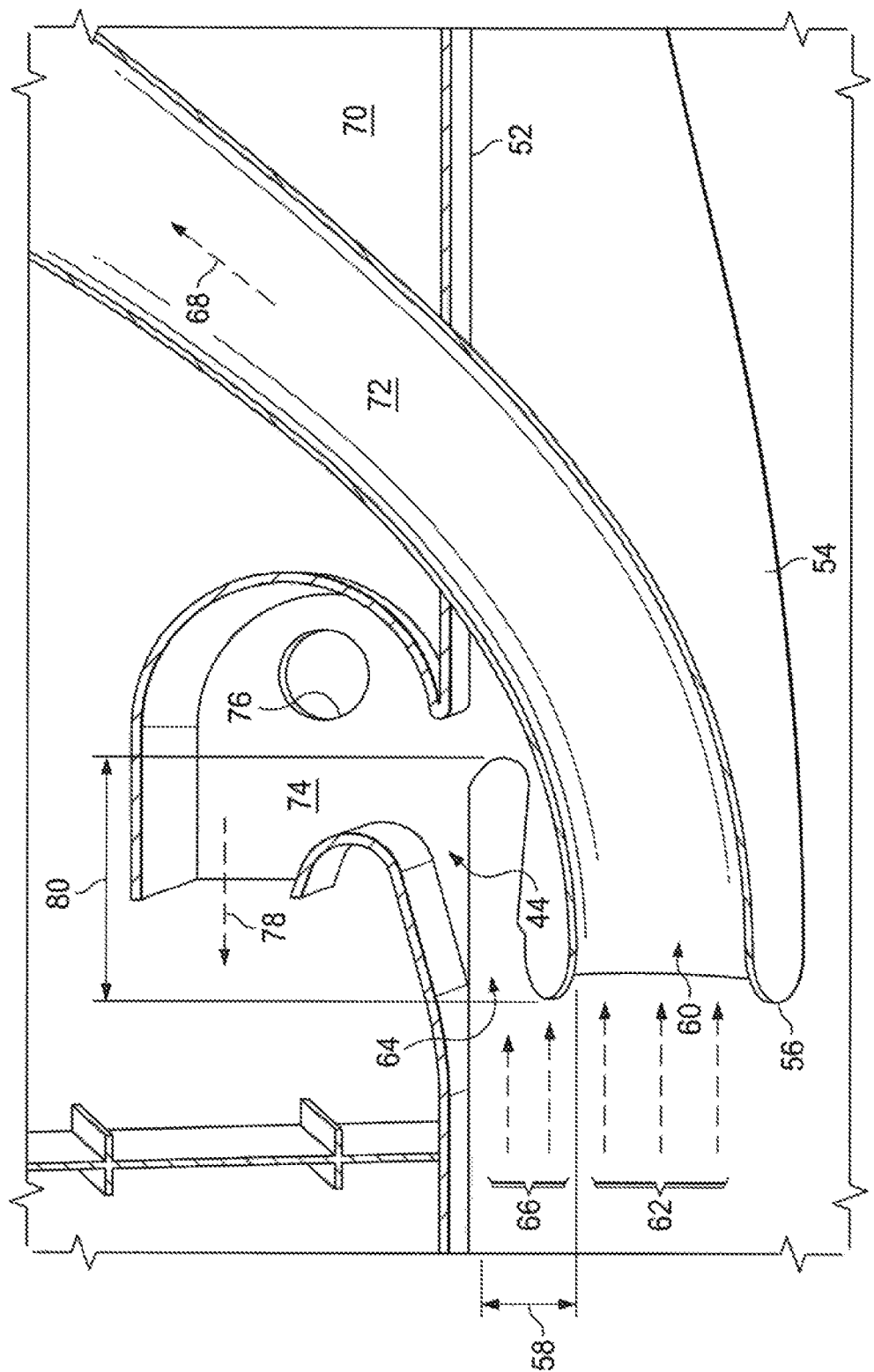
FIG. 5 illustrates a downward cross section view of an alternate embodiment of the present invention.

FIG. 5 illustrates a cross section view of an alternate embodiment of the present invention that depicts an enlarged entrance 64 to the secondary air inlet 44 for directing boundary layer air 66 into an engine bay compartment (not shown) to cool the engine or be directed to other subsystems of the rotorcraft without departing from the concepts disclosed herein. As described previously, the air flowing along the outside of the fuselage of an afro-aft has two components: a primary, non-disrupted component 62 and a secondary boundary layer component 66 along the surface of the fuselage. The enlarged entrance 64 is shown recessed into the offset 58 by a distance 80. The cross sectional area of the enlarged entrance 64 may be varied as one means of adjusting the relative proportions of inlet air directed to the engine intake 68 and to the subsystem that utilizes the boundary layer air 66. The fuselage 52 of a rotorcraft similar to the embodiment of FIGS. 3 and 4 includes a ram air inlet 54 having an input lip 56. The ram air inlet 54 admits the primary, non-disrupted component 62 of the inlet air flow at the engine inlet 60, which is conveyed through a duct 72 to the engine intake 68 to be compressed, mixed with fuel and ignited in the engine to power the rotorcraft.

The ram air inlet 54, which admits the non-disrupted component 62 at the engine inlet 60, is offset by a spacing 58 from the fuselage 52. This spacing 58 offsets the ram air inlet 54 from the fuselage and the boundary layer air flowing along it so that the primary ram air inlet 54 is outside the path of the boundary layer air 66 and conducts only the non-disrupted component 62 of the inlet air. Recessed in the offset space 58 is an inlet 64 for the secondary boundary layer air 66. The boundary layer air 66 may be fed through the enlarged entrance 64 into a plenum 74 to be conducted through an outlet 78 to provide cooling of the engine compartment in the rotorcraft or for other uses. The plenum 74 may include a drain 76 disposed in a lower-most portion thereof to enable draining moisture from the plenum 74.

A principal feature of the present invention, again referring to FIG. 5, is that the second air inlet 44, being recessed within the offset space 58 between the first air inlet 54 (for the primary, undisrupted air) and the fuselage 52, is not positioned forward or upstream of the first air inlet 54. This enables the second air inlet to be incorporated within the offset space 58 to improve the efficiency of utilization of the boundary layer air. In other words, the present invention locates the first air inlet 54 (for the "ram" air) forward of the boundary layer inlet 64 to minimize the effects of the boundary layer air on the ram air inlet, an important consideration in rotorcraft that require large amounts of air intake for powering the engine of the rotorcraft.

Another principal feature of the present invention is that this configuration has the additional advantage that locating the boundary layer air inlet 64 within the offset space uses the existing profile of the ram air inlet 54 without increasing the drag it causes to the free flow of air along the aircraft. In fact, by avoiding the obstruction to the inlet air caused by a solid or closed offset structure and providing a path through it for routing the boundary layer air away from and into the fuselage, the drag due to the ram air inlet structure is actually reduced. Moreover, there is no need to insert any additional structure in or near the enlarged entrance 64 to the boundary layer inlet 44 to reduce turbulence because the entrance 64 to the boundary layer inlet 44 is substantially placed out of and behind the flow path of the undisrupted primary air flow by the recessed positioning of the entrance 64 and, because the shape of the entrance 64 can be easily configured for minimum disruption to the boundary layer air flow into the plenum 74.

As is clear from the foregoing description of the present invention that the teachings of the prior art: (1) to extract boundary layer air before it reaches the ram air inlet; (2) to add a conforming "air guide" spaced forward of the edge of a flush inlet opening to improve control of boundary layer air; or (3) to inject cool air from within the aircraft into a hot air exhaust stream before it exits the equipment bay, are inadequate solutions to the problems addressed by the present invention.

While the invention has been shown in only a few of its forms, it is not thus limited but is susceptible of various changes and modifications without departing from the spirit thereof. Further, the present invention is readily adaptable to other kinds of aircraft, or land or watercraft having air inlets for inboard engines that are mounted on the outside of the fuselage.

What is claimed is:

1. A boundary layer utilization apparatus for intake of air to a high speed rotorcraft, comprising:
   a first air inlet adjacent an exterior surface of a fuselage of the rotorcraft of and offset therefrom by a predetermined offset space to minimize ingestion of boundary layer air flowing along the exterior surface, to provide primary air to an engine intake; and
   a second air inlet recessed within the predetermined offset space between the first air inlet and the fuselage to divert the boundary layer air proximate the first air inlet from ingestion into the first air inlet thereby to provide secondary air for cooling an engine compartment; wherein
   the second air inlet is disposed aft of the first air inlet.

2. The apparatus of claim 1, wherein:
   the first air inlet is configured as a scoop to direct, with minimal drag, the primary air into the engine intake.

3. The apparatus of claim 1, wherein:
   the second air inlet is disposed aft of the first air inlet to minimize hot gas re-ingestion.

4. The apparatus of claim 1, wherein the primary air comprises:
   a volume of substantially undisrupted air conducted to the engine intake for powering the aircraft.

5. The apparatus of claim 1, wherein the second air inlet comprises:
   an inlet ramp formed in the fuselage to merge the cross-sectional area of the second air inlet with the cross-sectional area of the offset space between the entrance of the first air inlet and the fuselage.

6. The apparatus of claim 1, wherein:
   the second air inlet is recessed within the predetermined offset space between the first air inlet and the fuselage to improve the utilization of the boundary layer air and reduce drag.

7. The apparatus of claim 1, wherein:
   the dimensions of the second air inlet are configured to conform to the predetermined offset space between the first, air inlet and the fuselage of the aircraft.

8. The apparatus of claim 1, wherein further comprising:
   a plenum within the fuselage for receiving the diverted boundary layer air.

* * * * *